Patented Aug. 18, 1942

2,293,277

UNITED STATES PATENT OFFICE 2,293,277

COLOR STABLE RESIN

William H. Carmody, Pittsburgh, Pa., assignor to The Neville Company, Pittsburgh, Pa., a corporation of Pennsylvania No Drawing. Application May 21, 1938, Serial No. 209,372

4 Claims. (Cl. 260—80)

This invention relates to the treatment of resin polymers which are ordinarily susceptible to discoloration with passage of time, or in contact with certain types of other materials, and a major object of the invention is to provide resins in which such after-discoloration is repressed or eliminated, and a method for the control of such after-discoloration, especially to eliminate the tendency of such resins to after-discolor, which is easily and cheaply performed, and is efficient for its intended purpose.

A variety of the synthetic resin materials now available suffer from the disadvantage that upon standing, whether in bulk or as a film consisting of or containing the resin, they become discolored to a more or less intense degree. A similar result follows with some resins when they are contacted with other substances, as in cooking with oils to make varnish. Such after-discoloration is accelerated and intensified by influences such as sunlight or other sources of actinic rays, e. g., ultra-violet radiation.

The ordinary coumarone-indene resin of commerce, commonly referred to as coumarone or para-coumarone resin, exemplifies both phenomena. This resin may be of relatively light color when first made, but upon storage it tends to assume a yellowish, or even brownish, color. Also, when coumarone resin is cooked with, for example, tung oil, in the manufacture of varnish, the product tends to be substantially darker than the color of the starting materials.

The phenomenon of after-discoloration which is exhibited by such resin materials has prevented, or at least has materially impeded, their widespread adoption for many uses to which their properties admirably adapt them. In particular, such after-discoloration virtually excludes these materials from use where permanently clear films are desired, in clear varnish compositions, and in white or light colored paints, varnishes, and the like coating compositions. The darkening of varnishes and similar compositions which results in cooking when such resins are present is likewise objectionable in the trade.

I have discovered, and it is upon this that my invention is in large part predicated, that the tendency of such resins to after-discolor may be controlled by hydrogenation of the resin to destroy, completely or in part, its after-discoloring tendency. I now believe that the tendency of such resinous materials to after-discolor is due to the presence in the resin molecule of an unsaturated group, or linkage, which acts as a chromophore when the resin reacts with other substances, with production of more or less intensely colored bodies. I believe further that hydrogenation in accordance with the invention saturates such chromophoric linkages and thus destroys their color-forming potentiality.

Through the practice of the invention it is possible, therefore, to control the after-discoloring tendency of the resins which possess such capability.

In the practice of the invention it is preferred to effect the hydrogenation in solution, and for reasons of hydrogen economy, as well as for ease of control, the best results are to be had through the use of a solvent which is inert, or substantially so, toward hydrogenation. For similar reasons the solution should ordinarily be substantially free from other substances capable of hydrogenation, at least to any substantial extent.

Investigations in connection with the invention have shown that although the invention may be practiced at normal room temperature and pressure, the use of elevated temperatures and pressures is desirable for reasons of economy because in most instances the rate of hydrogenation at normal atmospheric pressure and temperature is too slow from a commercial standpoint. Considering first the effect of temperature, tests of the invention thus far have shown that increases in temperature from room temperature upward are accompanied by an increase in the rate of hydrogenation. The upper limit of temperature is fixed by that which would have an adverse effect upon the result. That is, these synthetic resins tend generally to become depolymerized or cracked, with reduction in molecular magnitude, at moderately elevated temperatures. Also, after hydrogenation of the resin it is possible, at least in some cases, to cause hydrogen to be split off if the temperature be raised somewhat above the hydrogenation temperature. The upper limit of temperature useful in the practice of the invention is accordingly that at which degeneration of the resin occurs, whether of the hydrogenated or unhydrogenated polymer.

Although the exact temperature at which decomposition will occur is dependent in part upon the molecular magnitude of the polymer molecule, and generally becomes lower as the molecular magnitude increases, it may be noted that such temperatures are known for various resins and are easily determinable in any instance. For example, degeneration of the coumarone-indene resins occurs at temperatures as low as 250° to 300° C., and even in solution it is best to operate at temperatures not over about 250° C., suitably not over about 225° C., while it is desirable to hydrogenate at, say, not over 200° to 205° C. Similarly, polycyclopentadiene resins are degenerated in the vicinity of 300° C., so the treatment should be at lower temperatures. An advantage of operating in solution in the practice of the invention is that thereby any tendency toward decomposition due to local overheating, such as might occur with fused resin, is avoided. Within the range between normal temperature and that at which degeneration occurs, however, the essential effect of a change in temperature is that which would normally be expected, namely, primarily an alteration in the rate of reaction, for which reason the temperature may, in general, be chosen within such range to afford a rate of reaction which in combination with other factors affords commercially desirable economy.

Similarly, as far as has been determined increase in pressure exerts its usual effect of increasing the rate of hydrogenation and the equilibrium attained, so that for many purposes the pressure may be correlated to the temperature to afford, in conjunction with time of treatment, suitable operating economy.

Various hydrogenation catalysts are known. For most purposes it is preferred, however, to use a metallic hydrogenation catalyst, most suitably nickel, and I have found that the so-called "Raney" nickel catalyst is adapted to give good results in the practice of the invention. This catalyst is made by adding a powdered nickel-aluminum alloy to an aqueous solution of alkali, whereby the aluminum is dissolved leaving the nickel in a highly porous and highly active catalytic state. The alloy may be ground to, say, 200 mesh, and added to a 10 per cent solution of caustic soda. The nickel is washed to free it from residual impurities and is then transferred, without undue exposure to the air, to a hydrocarbon liquid from which residual water may be boiled. The suspension of catalyst is then added in appropriate amount to the solution of resin to be hydrogenated.

Coumarone-indene resin is one which particularly exemplifies, as pointed out hereinabove, the phenomenon of after-discoloration, exhibited in this case by development of yellowish or brownish colors. It may be selected, therefore, to exemplify the benefits derivable from the invention as well as the ability to vary the operating conditions.

*Test A.*—In one test 50 grams of a coumarone-indene resin having a melting point of 160° C. were dissolved in 70 cc. of petroleum benzine having a boiling range of approximately 90° to 135° C., and there were added 50 grams of Raney nickel catalyst. The mixture was placed in a steel bomb which was flushed out with hydrogen to displace residual air. The bomb was closed and hydrogen was charged into it at 310 pounds pressure at 26° C. The bomb and its contents were then slowing warmed to and held at a maximum temperature of about 150° C., and the bomb was re-charged with hydrogen three times when absorption of hydrogen caused the total pressure to fall to between 200 and 250 pounds. At the end of eight hours the reaction was substantially complete, as indicated by the slow rate of pressure drop, but the hydrogenation was conducted for a total of twenty hours, although the pressure remained substantially constant during the last twelve hours. The heating was then discontinued, and after the contents of the bomb had cooled the solution was filtered to remove the nickel catalyst; the solvent was then distilled from the filtrate, leaving the solid resin. The untreated resin exhibited pronounced yellowing within three or four days, and was decidedly brown after sixty-five days. In contrast, the hydrogenated resin exhibited no change in color after sixty-five days' time, being thus substantially completely resistant to after-yellowing.

*Test B.*—In another test 100 grams of coumarone-indene resin of the same grade were dissolved in 150 cc. of petroleum benzine and placed in a bomb together with 100 grams of Raney nickel catalyst. Hydrogenation was conducted for thirteen hours at a maximum temperature of 100° C. and a maximum hydrogen pressure of 130 pounds. The hydrogenated resin showed a reslative yellowing tendency of about 15 per cent, which represents a resin commercially acceptable as non-yellowing for many purposes. This test illustrates the facts that relatively low pressures and temperatures suffice to produce the benefits of the invention, and that partial elimination of yellowing tendency may be achieved also where the reduced after-yellowing suffices for commercial purposes.

Relative yellowing values are derived by a standardized colorimetric test in which a value of 100 per cent yellowing tendency is given by the yellowness developed by a thin film of high grade unhydrogenated coumarone-indene resin having a melting point of 165° C., and an initial color depth of 1.5. A film of this resin is deposited on a glass slide at normal room temperature from a 20 per cent toluol solution of the resin, the solution being allowed freely to spread for evaporation. The yellowing effect is that produced by subjecting the film to ultra-violet light of maximum intensity for a period of five hours. It may be explained that a direct exposure to ultra-violet light for a period of five hours substantially exhausts the after-yellowing potentiality of the resin, any increase in color intensity which it is possible to develop thereafter being negligible.

This standardized constant of yellowing tendency is converted into conveniently usable units of color intensity as follows. Two glass tubes are mounted in parallel vertical adjacency. These tubes have flat bottoms and are so mounted that glass slides may be introduced beneath them. An eye-piece over the tubes brings the slide images seen through the tube bottoms visually into apparent contact with each other. The slide yellowed by ultra-violet light is inserted beneath one tube, and distilled water is introduced into the tube up to a convenient level therein. An unexposed slide is introduced beneath the other tube, and into this second tube there is introduced a solution of arbitrarily selected coloration. In this method there is used a solution of 4 milligrams of potassium dichromate in 1 litre of distilled water, which provides a constant color intensity. This solution is introduced into the second tube until it has reached such level that the color depth is apparently uniform for the two tubes. The space between the dichromate level and the bottom of the tube is then graduated, the total height of the column being given the value of 100; and desirably graduation in the same units is continued above the level of the dichromate column to provide for evaluation of color intensity exceeding that of the resin which has been made the standard.

In evaluating the yellowing potentiality of a hydrogen-modified resin, two tubes of which one is provided with the standard graduations are used. Duplicate slides of the hydrogen-modified resin are made, and one of them is exposed to ultra-violet light for a period of five hours. They are then placed beneath the tubes, the unexposed slide being placed beneath the tube which is graduated, and distilled water being put into the tube overlying the exposed slide. The yellowing value of the resin is then obtained by reading on the graduated tube the height of the standardized dichromate solution which produces an apparent uniformity in color between the unexposed resin and the exposed resin. In so evaluating resins the exposed and unexposed slides must be of the same resin.

The benefits which flow from the invention appear to result from the destruction of a structure present in the resin molecule which is responsible for the development of colored bodies upon reaction of the resin with other materials. While the exact mechanism is not known with complete certainty, a reasonable explanation of after-yellowing of coumarone-indene resin is as follows.

It is known that cyclopentadiene produces intensely colored bodies, the so-called fulvenes, upon reaction with aldehydes and ketones, i. e., upon reaction with compounds containing a upon reaction with compounds containing a $>C=O$ structure:

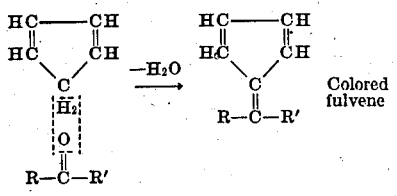

R and R' may be hydrogen or an alkyl or aryl radical.

The indene monomer

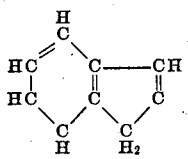

gives color reactions with aldehydes and ketones which are typical of those obtained with cyclopentadiene, and hence presumably through similar fulvenation.

Indene forms homopolymers of the chain type, and the structure of the resin molecule may be represented as follows:

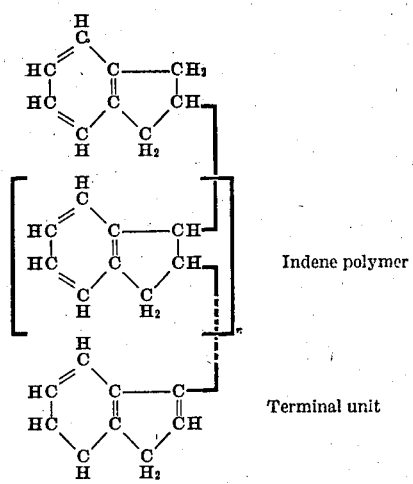

Indene polymer

Terminal unit

It will be observed from the foregoing structural formula that the structure of the terminal unit is essentially that of the indene monomer for which reason it likewise should be capable of forming fulvenes. That this is the case has been demonstrated by reacting the indene polymer with aldehydes and with ketones. In these tests there was used a 10 per cent solution of coumarone-indene resin in an aromatic solvent. To a portion of the solution there were added, without heating, a small amount of acetone and a few drops of an alcoholic solution of sodium hydroxide. A color reaction developed immediately which continued to intensify for a period of about one-half hour, at the end of which time the solution was a deep brownish red. Acetaldehyde was added under similar conditions to the resin solution, to cyclopentadiene, and to indene monomer, and in each case a relatively deep brown color developed.

The occurrence of after-yellowing is reasonably explainable on the basis of this ability of the resin to form fulvene bodies:

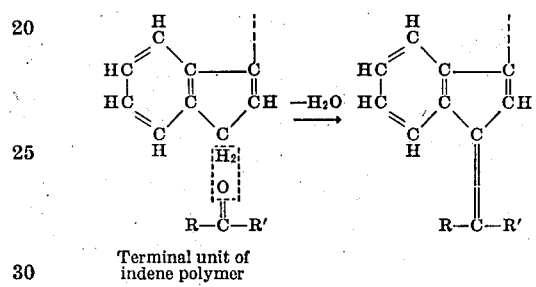

Terminal unit of indene polymer

Although I do not limit myself to this explanation, it is reasonable to suppose that in the presence of air oxygen may enter the indene molecule with production of an aldehyde or ketone structure capable of reacting with an unoxidized indene polymer molecule with production of the intensely colored fulvene body. Such oxidation might be in accordance with the following formulae:

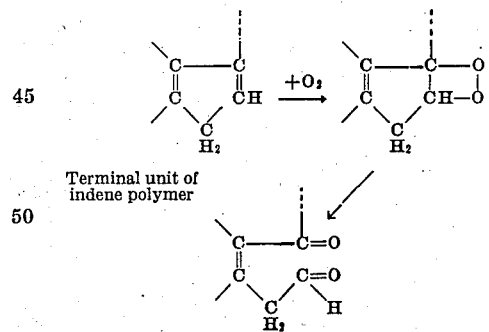

Terminal unit of indene polymer

This oxidized body, containing two reactive $>C=O$ groups, could react in the manner indicated above with the unoxidized indene polymer to produce color bodies productive of after-yellowing. Coumarone may be oxidized similarly, with similar results.

The results attained through the practice of the invention are thus explainable through the introduction of hydrogen into the terminal cyclopentadiene nucleus. If either of the ethylenic linkages of that nucleus are saturated with hydrogen the power of fulvenation is lost. Such hydrogenation does not necessarily destroy the reactivity of the resin molecule, but through the reduction or elimination of unsaturation, the color-forming power is correspondingly reduced or destroyed. This explanation is thus in keeping with the facts as now known.

In hydrogenating these resins the first result is one of bleaching colored bodies initially present in the resin. This occurs promptly and readily under even the mildest operating conditions. All that it does, however, is to lighten the normal resin color without to any degree affecting after-yellowing. That is, this bleaching effect does not result from any substantial hydrogen-modification of the resin molecules; rather it results merely from destruction of pre-existing color structures in the resin without altering the structure responsible for after-yellowing.

The second result attributable to hydrogenation of the resin, and that chiefly sought by this invention, is color stabilization, i. e., an effect resulting from hydrogen-modification of the polymerized molecules in such manner that the tendency of the resin to go through chemical changes resultant in after-yellowing is in practical effect inhibited. This is accomplished by destruction of a structure responsible for forming color bodies, and on the foregoing theory, saturation of one or both of the double bonds of the cyclopentadiene radical of the terminal unit of the indene polymer.

From the foregoing structural formulae it will be observed that a third course of hydrogenation is possible, namely, hydrogenation of the aromatic nuclei. Considering an average commercial coumarone-indene resin of high melting grade, saturation of one of the cyclopentadiene double bonds, with elimination of yellowing, might be effected by about 2 pounds of hydrogen per 800 pounds of resin, which is but a small part of the hydrogen which such resin can take up if its aromatic nuclei are also fully saturated. Since hydrogenation of the aromatic nuclei is unnecessary for curing after-yellowing, and since it thus consumes hydrogen, it would be desirable to restrict hydrogen entry to that controlling color stability. However, both reactions proceed concurrently, although to insure positive curing of yellowing a powerful catalyst is needed, as indicated above.

Although color stabilization is the chief desideratum of the invention, I have found that hydrogenation of the aromatic nuclei is compensated by resultant improved solubility of the resin in hydrocarbon solvents. Resin solubility as referred to herein is determined by dissolving 5 gm. of resin in 20 gm. of Stoddard solvent naphtha, using gentle heating. The solution is then cooled and the temperatures determined at which the solution becomes turbid, and at which definite precipitation occurs.

As evidencing this result, the 160° M. P. resin used in Test A had a solubility of 65° C. before treatment. After treatment it could be shaken into Stoddard solvent naphtha at −14° C. Test B changed the solubility of the resin from 59° C.–56° C. before treatment, to 35° C.–33° C. after treatment. In Test B the improvement in solubility was less than in Test A because the pressure was lower, it being apparently true that higher pressures favor more far-reaching hydrogenation of the aromatic nuclei, with greater improvement in solubility. Although lower pressures favor more complete destruction of the structures responsible for color development upon aging, yet after-yellowing is repressed sufficiently for many or most purposes even at high pressures in hydrogenation. These factors are exemplified by the following tests made with a coumarone-indene resin of 165° C. M. P., and having an initial color of 1.5 on the resin color scale.

*Test C*

| Resin | 4530 grams |
| Solvent | 4000 cc. |
| Raney nickel | 3% weight of resin |
| Temperature | Maximum 215° C. |
| Time | 18 hours |
| Pressure of $H_2$ | 470 lbs. |

| Sample | Hours | Solubility | Yellowing |
|---|---|---|---|
|   |   | °C. |   |
| (a) | 0 | 59–56 | 100 |
| (b) | 1 | 50–47 | 59 |
| (c) | 2.25 | 48–45 | 41 |
| (d) | 3 | 48–46 | 35 |
| (e) | 7.25 | 43–41 | 29 |
| (f) | 11.75 | 41–39 | 18 |
| (g) | 18 | 38–36 | 12 |

The treated resin had an imperceptible color, and test showed it to be practically non-yellowing and commercially acceptable.

*Test D*

| Resin | 4530 grams |
| Solvent | 4000 cc. |
| Raney nickel | 6% weight of resin |
| Temperature | Maximum 224° C. |
| Time | 17 hours |
| Pressure of $H_2$ | 370 lbs. |

| Sample | Hours | Solubility | Yellowing |
|---|---|---|---|
|   |   | °C. |   |
| (a) | 0 | 59–56 | 100 |
| (b) | .5 | 54–52 | 92 |
| (c) | 1.5 | 46–44 | 69 |
| (d) | 2.5 | 42–40 | 46 |
| (e) | 12.5 | 26–24 | 38 |
| (f) | 16.5 | 20–18 | 31 |

This treatment also bleached the resin to an imperceptible color. Upon exposure to ultra-violet light it developed less than 0.25 color on the resin scale, which renders such a resin commercially acceptable for many uses to which the untreated resin would be unfitted.

Again, the same grade of resin hydrogenated fourteen hours at a maximum temperature of 220° C., and a maximum hydrogen pressure of 740 pounds, using 4 per cent of Raney nickel, was not only satisfactorily resistant to after-yellowing (less than 0.5 color intensity) but showed no precipitation from Stoddard naphtha at minus 63° C., showing how far-reaching improvement in solubility may be.

High molecular weight resins may be treated also. For instance, a resin was made from crude solvent naphtha using tin tetrachloride as a catalyst. Its melting point was 237° C., indicating a molecular weight of about 2500. This was hydrogenated, using cyclohexane as a solvent, at a maximum temperature of about 200° C., and a maximum bomb pressure of 1950 pounds (initial hydrogen pressure, 1270 pounds at room temperature), using 100 gm. of resin and 50 gm. of Raney nickel. The resin produced was colorless, its solubility was 28° C., and it was soluble in linseed oil and petroleum solvents. Prior to treatment it was not soluble in Stoddard solvent naphtha at the boiling point, or in linseed oil.

As further exemplifying the invention reference may be made to the treatment of resins produced from naphthalene, such as those made by condensation with aldehydes. One type of such resins is produced by reacting naphthalene with formaldehyde in the presence of sulfuric acid. These resins exhibit a pronounced tendency toward after-yellowing upon exposure to air and light, and actinic radiation accelerates such discoloring reactions. Hydrogenation in accordance with the invention may be applied to the inhibition of the after-yellowing tendency of these resins also. For instance, 100 grams of a commercial dinaphthylmethane resin of this type were placed in a pressure container together with 200 cc. of cyclohexane and 50 grams of Raney nickel catalyst. After the air had been flushed from the container with a stream of hydrogen it was closed and hydrogen introduced to a pressure of 1070 pounds. The container and its contents were heated to a maximum temperature of 195° C. within one-half hour, during which time the pressure dropped to 380 pounds. Hydrogen was then introduced to rebuild the pressure to 1090 pounds, while maintaining the temperature of the reaction mixture, and fifteen minutes later the pressure had dropped to 580 pounds. The bomb was recharged with hydrogen to 1090 pounds, and further hydrogenation continued. At the end of nine hours the bomb and its contents had cooled to room temperature, the residual pressure being 460 pounds at that time. The solution was filtered to separate the nickel, the filtrate was distilled to remove the solvent, and the hydrogenated resin recovered. Exposure of the hydrogenated resin to ultra-violet light for a period of five hours did not cause any yellowing.

The invention is applicable also to resins other than those referred to hereinabove, such, for instance, as polycyclopentadiene resins, and from my investigations I have reason to believe that it is applicable generally to the synthetic resins which exhibit the phenomenon of after-discoloration.

As further exemplifying the operating conditions, a resin was made by thermal polymerization of the polymerizable constituents of a crude solvent naphtha whose content of unsaturated constituents was composed chiefly of dicyclopentadiene. 100 grams of this resin, having an initial color intensity of 6, were dissolved in 200 cc. of petroleum benzine and placed in a bomb together with 50 grams of Raney nickel catalyst. Hydrogen was introduced to a pressure of 1200 pounds and the bomb and its contents were heated during about forty-five minutes to approximately 190°, the pressure increasing during this interval to 1680 pounds, due to the temperature rise. Absorption of hydrogen began at about 200° and during the following hour the pressure dropped to 910 pounds. The bomb was then allowed to cool. When cool the pressure was 310 pounds. The hydrogen pressure was rebuilt to 1180 pounds and the bomb again heated to about 210° C. during forty-five minutes. At this time and temperature absorption again occurred and during the following hour and ten minutes the pressure dropped from 2080 pounds to 1610 pounds. The bomb was again permitted to cool, and at 50° C. the pressure was 850 pounds. The hydrogen was recharged to a pressure of 1210 pounds and the bomb reheated to 210° C. in fifty-five minutes, absorption of hydrogen again beginning at that time and temperature. During the next hour and forty minutes the pressure fell to 1770 pounds and remained constant during the following half-hour, when the source of heat was removed and the bomb allowed to cool. The resin recovered after filtration from the nickel and subsequent distillation of the solvent showed a color intensity of less than 0.5.

It thus appears that the invention is applicable to the reduction or elimination of after-discoloration in resins exhibiting such tendency. For commercial purposes it is not necessary in all instances to completely eliminate the tendency to after-discolor because for some purposes it suffices if the normal tendency is repressed. That is, for some purposes it is permissible for discoloration to occur to an extent representing a fraction of that which would occur without such treatment. By regulation of the temperature, pressure and time of treatment it is possible to control the extent to which after-discoloration will occur in the treated resin.

The mechanism of curing of after-yellowing in resins made from, for instance, dicyclopentadiene, is not necessarily that of destruction of a fulvene-forming structure as in the case of coumarone-indene resin. The exact structure of polycyclopentadiene resin has not been absolutely established; according to one proposed formula the explanation which applies to coumarone resin for the elimination of after-yellowing would not apply, while according to another it would. Be this as it may, hydrogenation destroys a color-forming structure whether or not it is a fulvene-forming linkage.

However, the invention is not restricted to the treatment of resins containing a true fulvene-forming structure, as evidenced by its applicability to the treatment of the naphthalene-formaldehyde resins to which reference has been made. The condensation of naphthalene and formaldehyde in the presence of sulfuric acid results, apparently, in the formation of dinaphthylmethane in which the hydrogen atoms of the methylene residue are reactive with an aldehyde or a ketone as represented by the following structural formula:

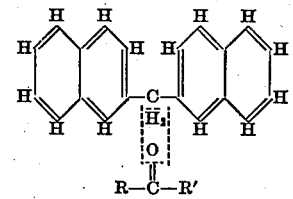

Although such a reaction of dinaphthylmethane is not productive of a true fulvene, it will be observed that in this as in all of the other instances cited the production of a colored body occurs through a reaction of a carbon atom which is flanked on each side by a double bond, giving the chromophore $=C-C-C=$, and that in all of these cases the color-forming power is destroyed by saturation of one of those linkages. The particularly pronounced tendency of the cyclopentadiene and coumarone resins toward after-yellowing is explainable by the fact that this chromophore group is associated with a conjugated double bond system, which is recognized as intensifying the action of chromophores.

Whether or not the foregoing explanations are correct, it is true that hydrogenation in accordance with the invention does reduce or destroy, according to the conditions of treatment, the tendency of these resins toward after-discoloration.

From what has been said it will be understood that various modifications are permissible in the practice of the invention. Thus, if a particular batch of resin is not rendered adequately color-stable by a single treatment with hydrogen, satisfactory results may be had by repetition of the treatment, especially with fresh catalyst.

This application is a continuation-in-part of my copending application Serial No. 1,897, filed January 15, 1935.

According to the provisions of the patent statutes I have explained the principle and method of practicing my invention and have described what I now consider to represent its best embodiment. However, I desire to have it understood that, within the scope of the appended claims, the invention may be practiced otherwise than as specifically described.

I claim:

1. As a new article of manufacture, hydrogenated polycyclopentadiene resin characterized by low tendency to after-yellowing as compared with the same resin in unhydrogenated state.

2. As a new article of manufacture, hydrogenated polycyclopentadiene resin characterized by being substantially non-yellowing as compared with the same resin in unhydrogenated state.

3. The method of controlling after-discoloration in a solid polycyclopentadiene resin polymer susceptible thereto and containing structure capable of fulvene formation, which comprises providing a solution of said resin in a solvent inert to hydrogen and substantially free from substances other than said resin capable of substantial hydrogenation, adding to the solution a metallic hydrogenation catalyst, subjecting the mixed solution and catalyst to gaseous hydrogen at a pressure of about 130 to 2000 pounds per square inch and at a temperature within the range 100° to 300° C. but below that causing degeneration of the resin and thereby effecting hydrogenation of said fulvene-forming structure and substantially eliminating after-discoloration of the resin, and separating catalyst from the thus treated solution and recovering solution of resin in said color-stabilized form.

4. That method of controlling after-discoloration in a solid resin made by polymerization of dicyclopentadiene, the polymer containing a =C—C—C= linkage reactive to form colored bodies, which comprises providing a solution of said solid resin in a solvent substantially inert to hydrogenation, adding to the solution metallic nickel hydrogenation catalyst, and subjecting the mixed solution and catalyst to gaseous hydrogen at a pressure between about 130 to 2000 pounds per square inch and at a temperature within the range 100° to 300° C. but below that causing degeneration of the resin to saturate at least one of the double bonds of said linkage and thereby substantially eliminate after-discoloration, separating said catalyst from the thus treated solution and recovering a solution of said resin in said hydrogenated and color stabilized form.

WILLIAM H. CARMODY.